(12) United States Patent
Taylor et al.

(10) Patent No.: US 11,913,839 B2
(45) Date of Patent: Feb. 27, 2024

(54) METHODS AND APPARATUS FOR IMPROVED THERMAL MONITORING BY CORRELATING INFRARED EMISSIVITY TO SURFACE TOPOGRAPHY

(71) Applicant: National Technology & Engineering Solutions of Sandia, LLC, Albuquerque, NM (US)

(72) Inventors: Samantha Taylor, West Chester, OH (US); Eric Christopher Forrest, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 733 days.

(21) Appl. No.: 16/876,725

(22) Filed: May 18, 2020

(65) Prior Publication Data
US 2021/0356325 A1    Nov. 18, 2021

(51) Int. Cl.
*G01J 5/00* (2022.01)
*B33Y 10/00* (2015.01)
(Continued)

(52) U.S. Cl.
CPC ............. *G01J 5/00* (2013.01); *B22F 10/00* (2021.01); *B33Y 10/00* (2014.12); *B33Y 30/00* (2014.12); *B33Y 50/02* (2014.12); *G01J 5/802* (2022.01); *B22F 10/10* (2021.01); *G01J 2005/0077* (2013.01)

(58) Field of Classification Search
None
See application file for complete search history.

(56) References Cited

U.S. PATENT DOCUMENTS

| | | |
|---|---|---|
| 6,875,979 B2 | 4/2005 | Cope |
| 7,513,964 B2 | 4/2009 | Ritter et al. |

(Continued)

OTHER PUBLICATIONS

Taylor, Samantha, and Forrest, Eric Christopher. Investigating Surface Roughness Effects on Emissivity for Metal Additive Parts.. United States: N. p., 2018. Web. (Year: 2018).*

(Continued)

*Primary Examiner* — Erica S Lin
(74) *Attorney, Agent, or Firm* — Yee & Associates, P.C.; Gregory M. Doudnikoff (57) ABSTRACT

Embodiments of the present disclosure provide an improved method and apparatus for thermal monitoring for a metal additive manufacturing system. An emissivity value of a top surface of an object to be manufactured is determined based, at least in part, on an arithmetic product of a predetermined roughness value and a predetermined slope-related value. The predetermined roughness value and slope-related values are predetermined based, at least in part, on measurements of a previously manufactured object. The system sinters a metal to form the top surface of the object to be manufactured. An infrared sensor detects radiation from at least a portion of the top surface of the object to be manufactured. A temperature is generated based, at least in part, on the detected infrared radiation and the emissivity value and the generated temperature is applied to a temperature utilization component of the system.

9 Claims, 5 Drawing Sheets

(51) Int. Cl.
  B33Y 30/00 (2015.01)
  B33Y 50/02 (2015.01)
  B22F 10/00 (2021.01)
  G01J 5/80 (2022.01)
  B22F 10/10 (2021.01)

(56) References Cited

U.S. PATENT DOCUMENTS

| 7,661,876 | B2 | 2/2010 | Liebmann | |
|---|---|---|---|---|
| 8,177,421 | B2 | 5/2012 | Liebmann | |
| 2016/0082766 | A1* | 3/2016 | Taguri | B41M 5/5218 428/32.25 |
| 2017/0120529 | A1* | 5/2017 | DeMuth | B22F 10/00 |
| 2019/0061267 | A1* | 2/2019 | Valero Navazo | G01J 5/00 |

OTHER PUBLICATIONS

Rodriguez, E. et al., "Integration of a Thermal Imaging Feedback Control System in Electron Beam Melting", Solid Freeform Fabrication Symposium, Austin, TX (2012), pp. 945-961.

Kralik, T. et al., "Factors Influencing Thermal Radiative Properties of Metals," 13th Cyrogenics IIR Intl. Conference, Prague (2016), 9 pages.

Boyden, S.B. and Zhang, Y., "Temperature and Wavelength-Dependent Spectral Absorptivities of Metallic Materials in the Infrared", Journal of Thermophysics and Heat Transfer, vol. 20, No. 1 (2006), pp. 9-15.

Cheng, B. et al., "Melt Pool Dimension Measurement in Selective Laser Melting Using Thermal Imaging", Solid Freeform Fabrication Symposium, Austin, TX (2017), pp. 1252-1263.

Depond, P.J. et al.; "In Situ Measurements of Layer Roughness During Laser Powder Bed Fusion Additive Manufacturing Using Low Coherence Scanning Interferometry", Materials & Design, vol. 154 (2018), pp. 347-359.

"Direct Metal Laser Sintering & Selective Laser Melting"; SPI Lasers (https://www.spilasers.com/application-additive-manufacturing/selective-laser-sintering-and-melting/ (publication date unknown, accessed Apr. 22, 2020), 3 pages.

Wen, C-D. and Mudaware, I., "Modeling the Effects of Surface Roughness on the Emissivity of Aluminum Alloys", International Journal of Heat and Mass Transfer, vol. 49 (2006), pp. 4279-4289.

Koepke, J.R. et al., "The Influence of Process Variables on Physical and Mechanical Properties in Laser Powder Bed Fusion", Univ. NM, Albuquerque, NM, Mechanical Engineering ETDs, Masters Degree Thesis (Apr. 10, 2019), 106 pages.

Strano, G. et al., "Surface Roughness Analysis, Modeling and Prediction in Selective Laser Melting", Journal of Materials Processing Technology, vol. 213 (2013), pp. 589-597.

Tian, Y. et al., "Influences of Processing Parameters on Surface Roughness of Hastelloy X Produced by Selective Laser Melting", Additive Manufacturing, vol. 13 (2017), pp. 103-112.

Townsend, A. et al., "Surface Texture Metrology for Metal Additive Manufacturing: A Review", Precision Engineering, vol. 46 (2016), pp. 34-47.

\* cited by examiner

METHODS AND APPARATUS FOR IMPROVED THERMAL MONITORING BY CORRELATING INFRARED EMISSIVITY TO SURFACE TOPOGRAPHY

GOVERNMENT LICENSE RIGHTS

This invention was made with Government support under Contract No. DE-NA0003525 awarded by the United States Department of Energy/National Nuclear Security Administration. The U.S. Government has certain rights in the invention.

BACKGROUND

1. Field

The disclosure relates generally to thermal monitoring and more specifically to methods and apparatus for determining emissivity of a surface of a metal object being manufactured by additive manufacturing systems.

2. Description of Related Art

Rapid prototyping of objects often involves forming a 3-dimensional object by fabricating layer upon layer to eventually form the entirety of a desired object. Such techniques are often referred to as additive manufacturing processes. In additive manufacturing processes using metal to form the layers, a layer of metal material, often in a powdered form, is laid down, portions of the metal are selectively heated to a malleable degree (typically melted to flow as a liquid) to form the desired structure of the layer, and then another layer is formed atop the prior layer. Each layer is formed in the same manner atop the prior layer until the desired three-dimensional object is completed.

A variety of techniques are well-known for metal additive manufacturing processes. Metal additive manufacturing processes include, for example, direct metal laser sintering ("DMLS") in which a layer of metallic material (typically in powder form) is selectively energized by a laser to the point of melting to flow into the shape of that layer of the desired object after which the layer is cooled to solidify the heated metal. Additional layers are formed by the same process until a completed three-dimensional object is created. Another common process, known as electron beam additive manufacturing ("EBAM"), is similar to DMLS but uses an electron beam as the energy source to heat the metal powder (typically in a vacuum environment). Yet another common process, laser engineered net shaping ("LENS"), is similar to DMLS, using a laser as the energy source to heat/melt the metal material, but uses different structures to deliver metal material to the layer as the metal material is melted and cooled to form a layer of a metal three-dimensional object. A variety of other additive manufacturing processes are well-known for constructing metallic objects.

Common to all such metal additive manufacturing processes is the need for accurate thermal monitoring of the metal material during the manufacturing process to assure proper quality and the desired structure. The metal material is energized (i.e., heated/melted) to allow the material to form the desired shape for each layer being formed and subsequently cooled to solidify the metal material. In some additive manufacturing processes, the material must be precisely preheated to a measured temperature to enable desired melting and flow. In some additive manufacturing processes, the cooling rate may also require a critical measurement of temperature. Often, additive manufacturing systems utilize infrared temperature measuring devices (e.g., infrared imaging devices or other infrared sensors) for such thermal monitoring applications to avoid contacting the melted metal material being formed.

Infrared sensors, such as infrared imaging devices, may operate in a variety of common infrared wavelengths including short-wave (1 to 3 microns), mid-wave (3 to 5 microns), and long-wave (7 to 13 microns). Thermal imaging devices generally measure the radiation emitted by the object in the infrared spectrum. The emissivity of the surface of a material is a measure of its effectiveness in emitting energy as thermal radiation. Quantitatively, emissivity is the ratio of radiated emissions of a material relative to the radiation from an ideal black body—i.e., a perfectly reflective surface approaches an emissivity of 0 and a highly emissive material approaches an emissivity of 1. The infrared radiation sensed by a thermal imaging device is converted to a temperature based, at least in part, on the emissivity value of the material being measured.

It is well-known that thermal radiation from an object is primarily a function of emissivity of the material that the object is made from. It is also well-known that the topography of the object's outer surface, at which the radiation is being measured, can contribute to the emissivity of the object. Accurately determining the emissivity of the object being manufactured in a metal additive manufacturing process, including the effects of the surface topography, is critical to accurately determining the temperature of the object being manufactured. Thus, it is important to accurately determine emissivity of the surface of an object to assure accurate thermal monitoring.

Therefore, it would be desirable to have a method and apparatus that overcome a technical problem with inaccuracy of temperature monitoring in metal additive manufacturing systems and processes.

SUMMARY

An embodiment of the present disclosure provides an improved method for thermal monitoring for a metal additive manufacturing system. The method determines an emissivity value based, at least in part, on an arithmetic product of a predetermined roughness value and a predetermined slope-related value, wherein the predetermined roughness value and the predetermined slope-related value are predetermined based, at least in part, on measurements of a previously manufactured object. A metal additive manufacturing system then sinters a metal to form the top surface of the object to be manufactured. An infrared sensor then detects infrared radiation from at least a portion of the top surface of the object to be manufactured. A temperature is then generated based, at least in part, on the detected infrared radiation and the emissivity value and the detected temperature is applied to a temperature utilization component of the metal additive manufacturing system.

Another embodiment of the present disclosure provides an improved thermal monitoring apparatus for use with a metal additive manufacturing system, the thermal monitoring apparatus comprising an emissivity determination component configured to determine an emissivity value, the emissivity value determined based, at least in part, on an arithmetic product of a predetermined roughness value and a predetermined slope-related value, wherein the predetermined roughness value and the predetermined slope-related value are predetermined based, at least in part, on measurements of a surface of a previously manufactured object manufactured by the metal additive manufacturing system. The apparatus further comprises an infrared sensor, coupled to receive the emissivity value, configured to detect infrared radiation from at least a portion of a top surface of a metal object to be manufactured. The thermal monitoring apparatus determines a temperature of the top surface of the object to be manufactured based, at least in part, on the detected infrared radiation and the emissivity value, and applies the temperature to a temperature utilization component of an additive manufacturing system.

Yet another embodiment of the present disclosure provides an improved metal additive manufacturing system comprising a controllable directed energy source for selectively forming a surface of a metal object to be manufactured and a thermal monitoring apparatus positioned to detect infrared radiation from at least a portion of the surface of the metal object to be manufactured. The thermal monitoring apparatus further comprises an emissivity determination component configured to determine an emissivity value, the emissivity value determined based, at least in part, on an arithmetic product of a predetermined roughness value and a predetermined slope-related value, wherein the predetermined roughness value and the predetermined slope-related value are predetermined based, at least in part, on measurements of a surface of a previously manufactured object manufactured by the metal additive manufacturing system. The thermal monitoring apparatus further comprises an infrared sensor, coupled to receive the emissivity value, configured to detect infrared radiation from at least a portion of a top surface of a metal object to be manufactured. The thermal monitoring apparatus determines a temperature of the top surface of the object to be manufactured based, at least in part, on the detected infrared radiation and the emissivity value. The system further comprises a temperature utilization component coupled to receive the temperature from the thermal monitoring apparatus. The temperature utilization component is configured to utilize the received temperature for at least one of: monitoring quality of the object to be manufactured based on the received temperature, and controlling the additive manufacturing system in manufacturing the object to be manufactured.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Surface roughness has a relationship with emissivity. Any metal surface produced in an additive manufacturing process will have some degree of roughness on its surface. The surface will have peaks and valleys in the top surface as each layer is constructed in the additive manufacturing process. The roughness of the surface may be expressed in terms of the average height of peaks and depth of valleys of the rough surface as well as slope-related values of peak to valley transitions. Two well-known standards organizations define measures of surface roughness—the American Society of Mechanical Engineers ("ASME") provides the ASME B46.1 standard entitled: Surface Texture (Surface Roughness, Waviness, and Lay). The International Organization for Standardization ("ISO") provides the ISO 4287 standard entitled Geometrical Product Specifications (GPS)—Surface texture: Profile method—Terms, definitions and surface texture parameters. Both standards are well-known and readily available to those of ordinary skill in the art and both define standards for determining roughness of a surface.

Depending largely upon angles of reflectance of radiation within a valley of the rough surface, infrared sensors may be more or less accurate in measuring temperature due to differences in the impact of surface roughness on actual emissivity of the material. Where the infrared wavelength is significantly greater than root-mean-square surface roughness (i.e., a very smooth or polished surface), a variety of well-known techniques are used for accurately measuring thermal characteristics of the rough surface. In these cases, the relatively minimal roughness of the surface has little, if any, effect on the emissivity of the material—and hence, little if any impact on the accuracy of the temperature measurement by an infrared sensor. However, where the infrared wavelength is shorter than the average height of the surface roughness (i.e., a relatively rough surface), such as is often the case in metal additive manufacturing processes, infrared measurement techniques, without the improvements of the disclosed embodiments, may be inaccurate due to the larger effect of the surface roughness on emissivity of the surface The surface roughness of a manufactured metal object varies depending on a number of known factors including the particular additive manufacturing process employed and the metal material being used to create layers of the object. Known techniques and systems, discussed below, may be used to measure the surface roughness of the surface of a typical object made from a particular material and made by a particular additive manufacturing system. Once measured for a particular metal material, used in a particular additive manufacturing system, in particular conditions and settings, measured roughness and valley angle values may be stored for input to an emissivity determination component and used to improve accuracy of temperature measurements using infrared sensors.

Figure 1:
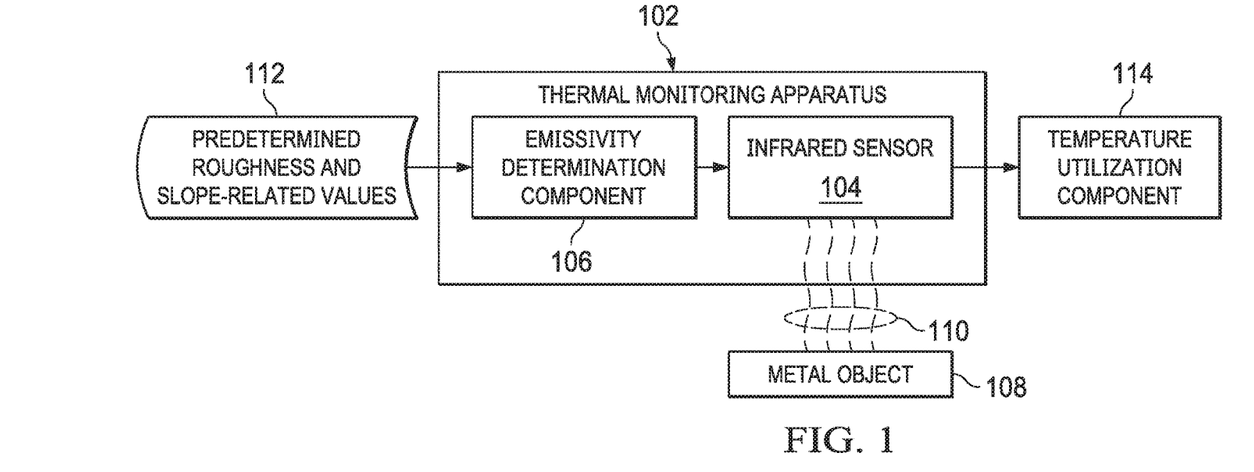
FIG. 1 is an illustration of a schematic diagram of an exemplary improved thermal monitoring apparatus in accordance with an illustrative embodiment.

With reference now to the figures and, in particular, with reference to FIG. 1, an illustration of a schematic diagram of a thermal monitoring apparatus 102 comprising infrared sensor 104 and emissivity determination component 106. The entire infrared spectrum may be considered as ranging from approximately 1 micrometer up to 1,000 micrometers. More precisely, practical ranges of sensitivity of infrared sensors useful in metal additive manufacturing processes fall in sub-ranges such as 1-3 micrometers (short-wave infrared or "SWIR"), 3-5 micrometers (mid-wave infrared or "MWIR"), and 7.5-13 micrometers (long-wave infrared (or "LWIR"). In some embodiments, infrared sensor 104 may comprise an infrared camera or other infrared imaging device sensitive to some or all of the above-identified sub-ranges of the infrared spectrum. In some exemplary embodiments, infrared sensor 104 may comprise a FLIR SC6811 MWIR camera.

In this example, emissivity determination component 106 can be implemented in software, hardware, firmware, or a combination thereof. When software is used, the operations performed by emissivity determination component 106 can be implemented in program code configured to run on hardware, such as a processor unit. When firmware is used, the operations performed can be implemented in program code and data and stored in persistent memory to run on a processor unit. When hardware is employed, the hardware can include circuits that operate to perform the operations in emissivity determination component 106

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Emissivity determination component 106 is configured to determine an emissivity value based on predetermined roughness and slope-related values 112 and applies the determined emissivity value to infrared sensor 104. Predetermined roughness and slope-related values 112 may be obtained from precise measurements for a particular metal material used in a particular additive manufacturing system operating in particular environmental conditions to generate a metal object. As discussed further below, these typical values may be predetermined and used to determine a corresponding emissivity value. In some embodiments, emissivity determination component 106 and infrared sensor 104 may be integrated into a single physical component such that the emissivity value is determined within the integrated single component based, at least in part, on predetermined roughness and slope-related values 112 applied to emissivity determination component 106. Emissivity determination component 106 may be any component that generates an emissivity value from the applied predetermined roughness and slope-related values 112. In some embodiments, emissivity determination component 106 may be a simple multiplier circuit that receives roughness and slope-related values as inputs and generates an arithmetic product of the two inputs as its output value. In other embodiments, emissivity determination component 106 may be a computing component programmed to output the arithmetic product of the roughness and slope-related values applied as inputs.

Predetermined roughness and slope-related values 112 may be provided as values supplied by a user input, provided as configuration parameters associated with thermal monitoring apparatus 102, provided as configuration switch settings associated with thermal monitoring apparatus 102, or provided by any other suitable mechanism for supplying predetermined roughness and slope-related values 112 for use in thermal monitoring apparatus 102.

Thermal monitoring apparatus 102 determines the temperature of the top surface of metal object 108. More specifically, infrared sensor 104 detects infrared radiation 110 emitted by the top surface of metal object 108. Based, at least in part, on the detected infrared radiation determined by infrared sensor 104 and the emissivity value determined by emissivity determination component 106, thermal monitoring apparatus 102 determines the present temperature of the top surface of metal object 108 and utilizes that determined temperature to control the manufacturing process by applying the determined temperature to temperature utilization component 114 or may utilize the determined temperature to monitor the quality of the object being manufactured.

In some embodiments, the temperature measurements can be employed to assess the quality of a part when other traditional methods of inspection may not be sufficient to fully assess the part quality. For example, accurate temperature measurements could be used to identify possible locations for defects that could be difficult to find if the geometry of the manufactured object is sufficiently thick or complex to prevent traditional inspections techniques like computed tomography scanning that are normally used to find internal defects in the part.

In some embodiments, temperature utilization component 114 utilizes the applied temperature to control the additive manufacturing processing of the particular system—i.e., heating the metal material and/or cooling the metal material to form the desired structure and desired quality. The particular control performed by temperature utilization component 114 is unique to the particular type of system to be controlled, the particular metal material used in the system, the particular object to be manufactured, and other considerations.

The improved accuracy of the material emissivity achieved by the exemplary embodiments herein enable more accurate measurement of temperature in the manufacturing process, which, in turn, improves detection of flaws in the manufactured object and improves control of the manufacturing process.

Figure 2:
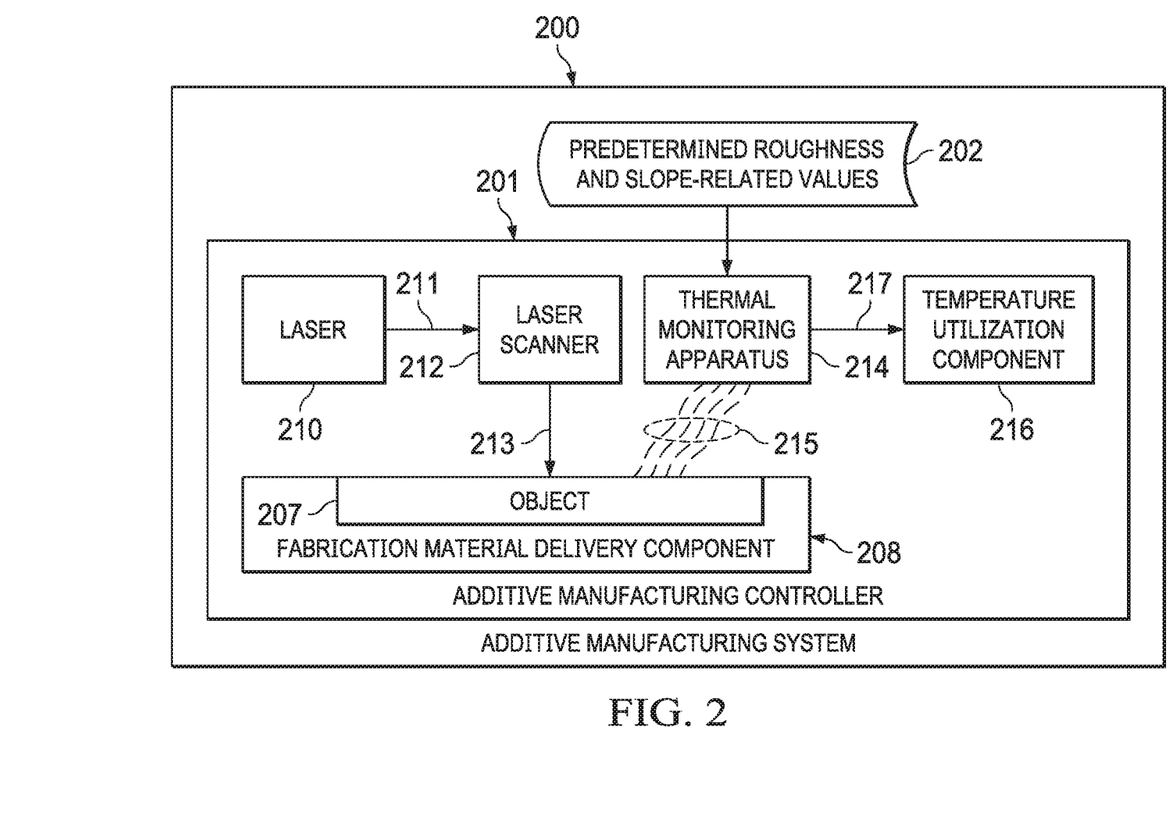
FIG. 2 is an illustration of a schematic diagram of an additive manufacturing system incorporating improved thermal monitoring apparatus in accordance with an illustrative embodiment.

Referring next to FIG. 2, an illustration of a schematic diagram of a simplified, exemplary, additive manufacturing system 200 is provided. A suitable controller, such as additive manufacturing controller 201, controls the overall operation of additive manufacturing system 200. Controller 201 may be implemented in software, hardware, firmware, or a combination thereof. When software is used, the operations performed by controller 201 can be implemented in program code configured to run on hardware, such as a processor unit. When firmware is used, the operations performed by controller 201 can be implemented in program code and data and stored in persistent memory to run on a processor unit. When hardware is employed, the hardware can include circuits that operate to perform the operations in controller 201.

As noted above, hardware implementations can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Laser 210 of additive manufacturing system 200 provides energy to heat metal powder to the point of flowing the material to form desired shapes on the top surface of metal object 207. More specifically, laser 210 produces collimated beam 211 that is selectively controlled by laser scanner 212 (e.g., optically redirected) to form redirected beam 213 controllably scanned over a bed of metal powder in fabrication material delivery component 208 to form structure in the top surface of object 207. In some embodiments, such as in an EBAM additive manufacturing process, laser 210 and laser scanner 212 may be replaced by suitable apparatus for generating and controllably directing an electron beam to supply the energy to form the top surface of object 207. More generally, a sintering apparatus may use any suitable controllable directed energy source such as a controllable electron beam or a controllable laser (as shown in FIG. 2).

Fabrication material delivery component 208 comprises any apparatus suitable for delivering a new top layer of metal material to be formed after a prior top layer has been formed into a desired structure. In some embodiments, fabrication material delivery component 208 may comprise, for example, an elevator/piston assembly to lower object 207 and distribute a new layer of metal material over a previously formed top surface. In some embodiments, fabrication material delivery component 208 may comprise, for example, an apparatus to spray or flow powdered metal material over the top surface of object 207 in coordination with the controlled redirection of the laser or electron beam energy to sinter the material.

Thermal monitoring apparatus 214 may be similar to thermal monitoring apparatus 102 of FIG. 1 detecting infrared radiation 215 from the top surface of object 207. Predetermined roughness and slope-related values 202 may be similar to predetermined roughness and slope-related values 112 of FIG. 1. Predetermined roughness and slope-related values 202 are provided as input to thermal monitoring apparatus 214. Thermal monitoring apparatus 214 determines an emissivity value based, at least in part, on the provided predetermined roughness and slope-related values 202. Based at least in part on the determined emissivity value and the detected infrared radiation 215, thermal monitoring apparatus 214 determines a temperature 217 for a portion of the top surface of object 207. Temperature 217 is then applied as an input to temperature utilization component 216.

In some embodiments, temperature utilization component 216 uses applied temperature 217 to evaluate the quality of object 207 based on temperatures of areas of the fabricated top surface of object 207. The quality may be monitored as the object is being formed, monitoring the heating process and the cooling process for the object as the layers are being formed. In some embodiments, temperature utilization component 216 may aid in controlling the processing performed by additive manufacturing system 200 by comparing the present temperature (217) to expected temperatures for the additive manufacturing process. For example, temperature utilization component 216 may be interfaced with computer systems such as Computer Numerical Control ("CNC") milling system (not shown) that controls the design and manufacture of a 3-dimensional object. Numerous other uses of generated temperature 217 by temperature utilization component 216 will be apparent to those of ordinary skill in the art.

It will be apparent to those of ordinary skill in the art that additive manufacturing system 200 of FIG. 2 is intended merely as suggestive of a structure that integrates improved temperature measurements, as achieved by the disclosed embodiments, into an additive manufacturing system. Similar improvements to temperature measurements may be employed by a variety of types of additive manufacturing processes and systems such as DMLS, EBAM, and LENS systems as noted above.

Figure 3:
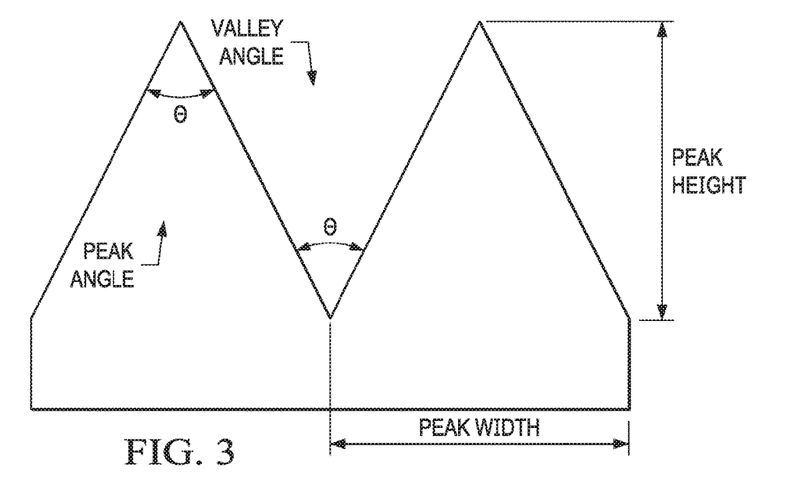
FIG. 3 is an illustration of various exemplary measures of surface roughness including, peak height, valley depth, peak angle, and valley angle in accordance with an illustrative embodiment.
Figure 4:
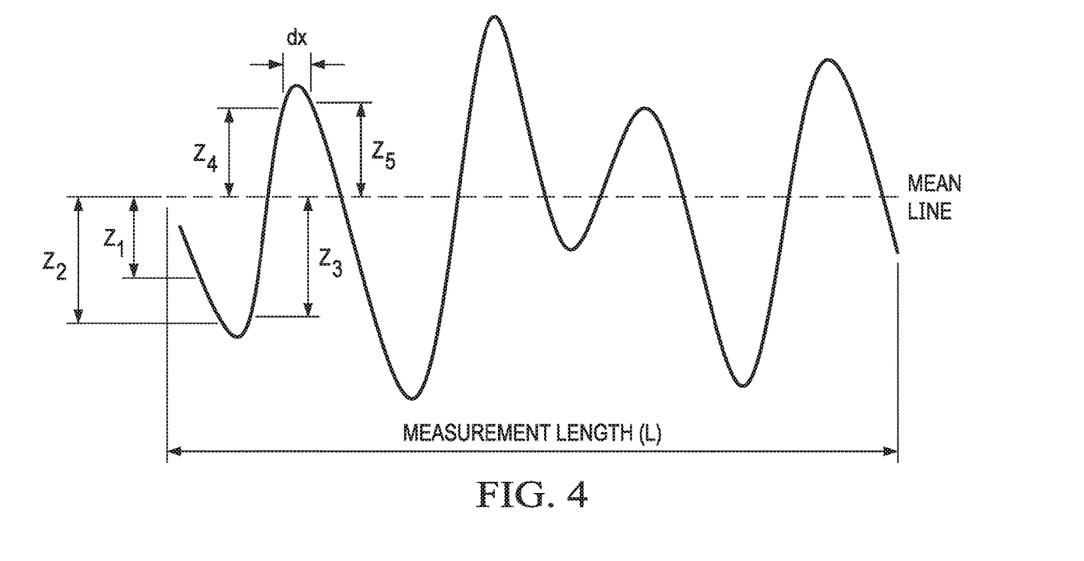
FIG. 4 is an illustration of exemplary measured values of a rough surface used in determining emissivity of the surface in accordance with an illustrative embodiment.

As discussed above, surface roughness, including peak height, valley depth, and the angles between such peaks and valleys, can affect the emissivity of the top surface of a metal object being manufactured through an additive manufacturing process. FIG. 3 is an illustration of a schematic depiction of the various measures of surface roughness including, peak height (equivalent to valley depth), peak angle, and valley angle. Various well-known techniques may be employed to measure surface roughness including, for example, X-ray Coherence Tomography, White Light Interferometry, Stylus-Based Contact Profilometry, and Fringe Pattern Projection Microscopy. Fringe Pattern Projection Microscopy may be preferred for its larger area of measurement, higher resolution, and the non-contact nature of its measurements. One exemplary system for providing such surface roughness measurement is the Keyence VR3100 microscope. Using such a microscope, the surface of a metal object produced using an additive manufacturing process may be scanned to determine the typical height of points in a Z-axis along a linear direction of scan (e.g., an average height along a linear x-axis scan). Such a linear scan may be repeated in an orthogonal axis (e.g., a y-axis orthogonal to the x-axis and the Z-axis) to produce a 2-dimensional scan to measure the surface roughness of a typical metal surface produced by sintering in a particular additive manufacturing environment. For each linear scan by such a microscope, FIG. 4 illustrates exemplary measurements along a linear scan axis ("L") and corresponding height in the Z-axis. For example, each point in the Z-axis ($Z_1$, $Z_2$, . . . $Z_5$, etc.), measures the height in the Z-axis for each corresponding point along the linear L-axis ($D_x$). In particular, for each transition between points along the linear L-axis (i.e., each d(x)), the corresponding change in Z-axis height (i.e., a corresponding Z(x)) may be determined. Such measurements of surface roughness may be performed once for a particular metal material used in a particular additive manufacturing process in particular environmental conditions and the measured values stored, recorded, or configured for later use in the manufacturing process.

Figure 5A:
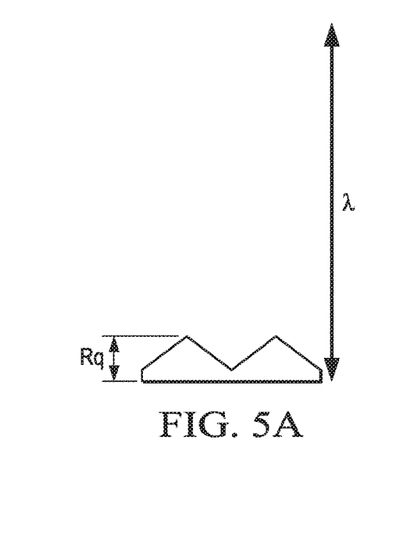
FIGS. 5A through 5C are illustrations of exemplary ratios of surface roughness and infrared radiation wavelengths in accordance with an illustrative embodiment.
Figure 5B:
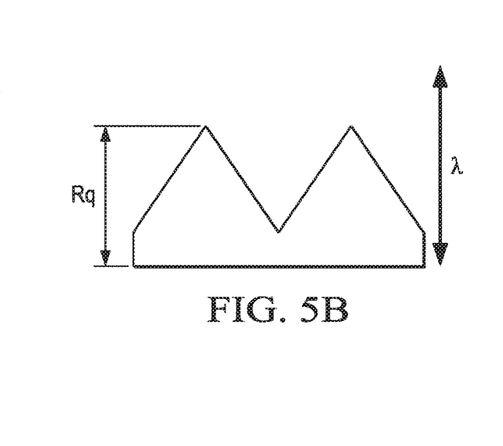
Figure 5C:
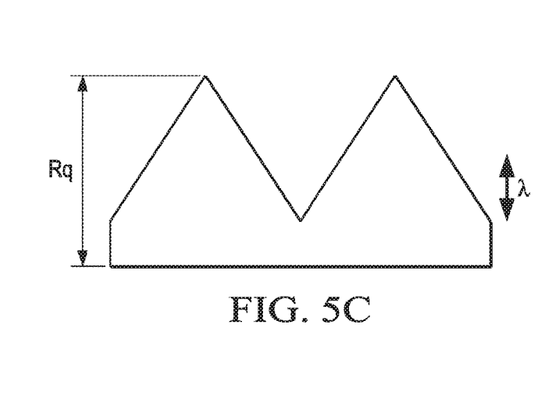

Emissivity can be affected by rough surfaces as may be encountered in metal additive manufacturing processes. In general, if the surface roughness (e.g., root-mean-square surface roughness) is significantly smaller than the infrared radiation wavelengths being employed (e.g., very smooth or polished surfaces), a variety of known techniques are well suited to accurately measure surface temperature. As depicted in FIG. 5A, the infrared wavelength ($\lambda$) employed by an infrared sensor (e.g., an infrared imaging device) is significantly larger than the root-mean-square ("RMS") roughness ($R_q$) and, thus, well-known techniques in existing thermal monitoring devices are well suited to accurately measure surface temperature. In other words, where the ratio of the average roughness to the infrared wavelength used for measuring temperature is much less than 1, existing temperature measurement techniques provide sufficient accuracy for temperature measurements. By contrast, where the infrared wavelength is approximately equal to or less than the average roughness (e.g., a relatively rough surface), as depicted in FIGS. 5B and 5C, reflections of infrared radiation within the valleys (i.e., within the wedges formed by the valleys between peaks) may play an important factor in accurately determining emissivity of the surface of the object and, hence, accurately determining temperature of the surface. In other words, where the ratio of the average roughness to a maximum wavelength of sensitivity of the infrared sensor is greater than about 0.7, emissivity is more difficult to estimate because the infrared radiation may reflect within the walls of a valley of the rough surface.

Based on measurements of surface roughness as discussed above, surface roughness value may be an average roughness value determined by arithmetic computations. For example, arithmetic surface roughness ($R_a$) may be determined by equation 1 below.

$$R_a = \frac{1}{L}\int_0^L |Z(x)|\, dx \quad (1)$$

Additionally, a slope-related value may be an average tilt angle ($R\Delta a$), averaged over multiple valleys of the rough surface, and may be computed as another measure related to surface roughness by equation 2 below.

$$R\Delta a = \frac{1}{L}\int_0^L \frac{|dZ|}{|dx|}\, dx \quad (2)$$

Those of ordinary skill in the art will also recognize that these values may be computed using root-mean-square calculations. For example, a roughness value may be an RMS surface roughness value computed by equation 3 below and a slope-related value may be an RMS slope computed by equation 4 below.

$$R_q = \sqrt{\frac{1}{L}\int_0^L Z(x)^2\, dx} \quad (3)$$

$$R\Delta q = \sqrt{\frac{1}{L}\int_0^L \left(\frac{dZ}{dx}\right)^2 dx} \quad (4)$$

Still further, these values may be averaged over a 2-dimensional area of a metal object surface such as an RMS roughness value computed by equation 5 below and an RMS slope value computed by equation 6 below.

$$S_q = \sqrt{\frac{1}{L_x L_y}\int_0^{L_y}\int_0^{L_x} Z(x,y)^2\, dx\, dy} \quad (5)$$

$$S\Delta q = \sqrt{\frac{1}{L_x L_y}\int_0^{L_y}\int_0^{L_x}\left(\left(\frac{dZ(x,y)}{dx}\right)^2 + \left(\frac{dZ(x,y)}{dx}\right)^2\right) dx\, dy} \quad (6)$$

Figure 6:
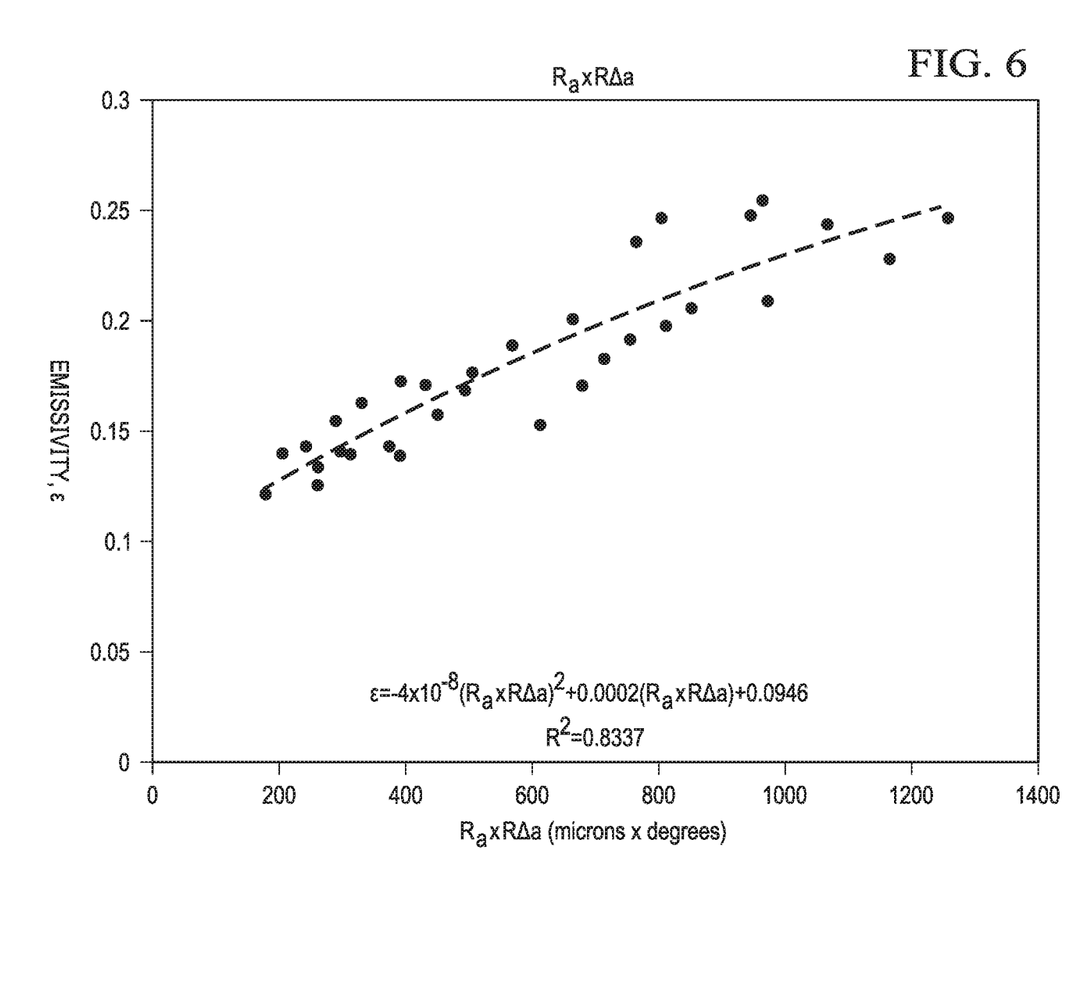
FIG. 6 is an illustration of a graph of a curve fit to data points correlating emissivity with the product of a surface roughness value and a slope-related value in accordance with an illustrative embodiment.

Using the roughness and slope-related values above (arithmetic average values or RMS values, linear or 2-dimensional values), an emissivity value may be determined based on an arithmetic product of the roughness and slope-related values. More specifically, a curve may be fit to the arithmetic product of a number of materials, fabricated using a variety of additive manufacturing processes, and environments (e.g., Ra*R$\Delta$a), to determine the emissivity for a particular metal material used in a particular additive manufacturing system in particular environmental conditions. FIG. 6 depicts a graph of exemplary data points and a curve fit to the points in which each point represents the emissivity of a particular sample object previously fabricated in a particular additive manufacturing environment operating in particular environmental conditions. In the graph of FIG. 6, the x-axis is the determined product of the measured average surface roughness value and the measured average tilt angle value for each particular sample and the y-axis is the emissivity ($\epsilon$) determined for that sample. A plurality of data points is shown in the graph, each representing actual measured values of average roughness and average tilt angle of the surface of various previously manufactured objects using a particular additive manufacturing systems in particular environmental conditions. A curve may be fitted to these measured data points to determine an emissivity value for a particular material given any of a wide range of surface topographies. Equation 7 below expresses a curve fitted to the measured data with a correlation coefficient ("$R^2$") of 0.8337.

$$\epsilon = -4\times 10^{-8}(R_a \times R\Delta a)^2 + 0.0002(R_a \times R\Delta a) + 0.0946 \quad (7)$$

Figure 7:
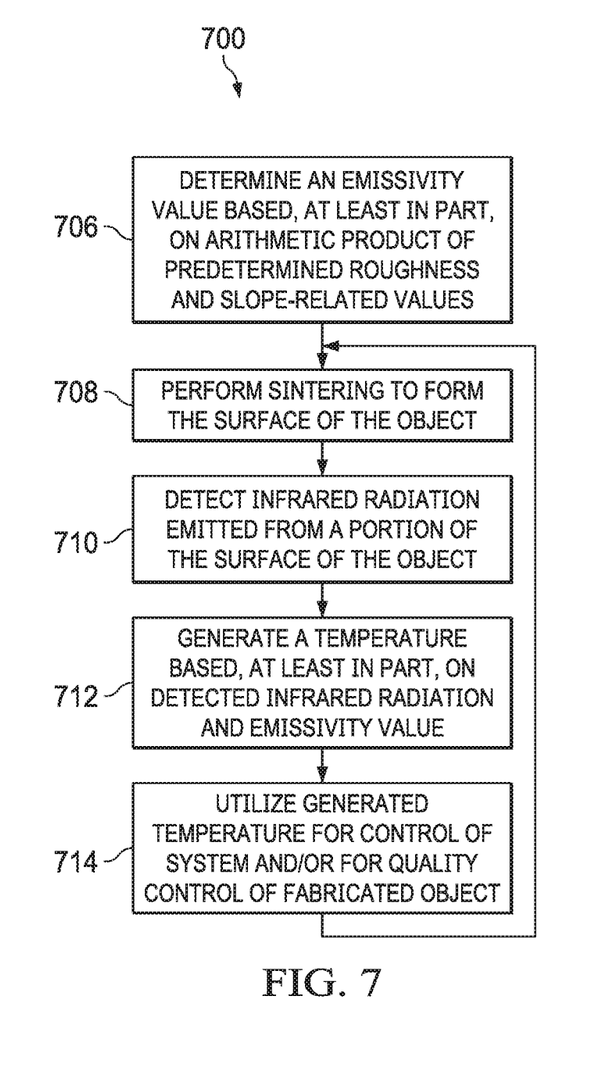
FIG. 7 is an illustration of a flowchart of a process for determining temperature of a surface in accordance with an illustrative embodiment.

FIG. 7 is an illustration of a flowchart describing a method 700 for accurately determining the temperature of the top surface of a metal object formed by an additive manufacturing process. Method 700 may be performed by a thermal monitoring apparatus such as thermal monitoring apparatus 102 of FIG. 1 or by a thermal monitoring apparatus 214 integrated within an additive manufacturing system such as system 200 of FIG. 2. The steps of the method may be performed by any suitable processing components such as a custom electronic logic circuit, an application specific integrated circuit ("ASIC"), a gate array or field programmable gate array ("FPGA"), a suitably programmed general purpose processor, a suitably programmed special purpose processor, or any other suitable apparatus for performing the steps of the method.

The process begins at step 706 in which an emissivity value is determined based, at least in part, on the arithmetic product of a predetermined roughness value and a predetermined slope-related value. As disclosed above, a roughness value of a typical surface of an object to be formed by an additive manufacturing system is predetermined and a slope-related value of the typical surface is also predetermined. A typical surface is a surface of a previously manufactured object produced using a particular metal material, in a particular additive manufacturing system, under particular environmental conditions. These predetermined values may be determined by, for example, Fringe Pattern Projection Microscopy techniques or other suitable processes. The predetermined roughness value and slope-related value (e.g., predetermined roughness and slope-related values 112 of FIGS. 1 and 202 of FIG. 2) may be provided as a user input to the thermal monitoring apparatus or an additive manufacturing system. In some embodiments, the predetermined roughness and slope-related values may be predetermined values stored as configuration parameters of the thermal monitoring apparatus. In other embodiments, the values may be provided as input through configuration switches or other suitable indicators of predetermined roughness and slope-related values. In some embodiments, the predetermined roughness value and slope-related value may be averages such that an average roughness value and an average slope-related value are provided for a typical surface manufactured by the particular additive manufacturing system using the particular metal material under particular environmental conditions. Still further, in some embodiments, the predetermined roughness and slope-related values may be determined as RMS values. As discussed above, the product of the predetermined roughness and slope-related values may be computed by an arithmetic/logic electronic circuit, by an ASIC or gate array, by a processor suitably programmed, or by any other suitable method and apparatus.

Steps 708 through 714 are then iteratively performed for each layer to be manufactured for the metal object by the additive manufacturing processes. At step 708, an additive manufacturing system (e.g., system 200 of FIG. 2) performs sintering to form the desired shape of the current top surface of the object. As described above, the sintering process is controlled in accordance with additive manufacturing standard procedures and systems to form a desired shape on the current top layer of the object to be manufactured. As above, the procedure may use laser energy, electron beam energy, or other suitable techniques for the particular additive manufacturing process. The specific temperatures required for the sintering process are a function of the type of energy applied and the specific material metal material being used for the manufacturing process. Similarly, temperatures required for particular cooling rates for the current top surface are a function of the type of energy applied and the specific material metal material being used for the manufacturing process.

At step 710, an infrared sensor (e.g., 104 of FIG. 1) of the thermal monitoring apparatus (e.g., 102 of FIG. 1 or 214 of FIG. 2) detects infrared radiation emitted from a portion of the top surface of the object being manufactured. As noted above, in some embodiments, an infrared sensor may be an infrared imaging device such as an infrared camera or other infrared sensor. At step 712, the thermal monitoring apparatus (e.g., 102 of FIG. 1 or 214 of FIG. 2) generates a temperature of the top surface of the object being manufactured based, at least in part, on the detected infrared radiation and the determined emissivity value. At step 714, the temperature determined by step 712 may be utilized by, for example, applying the temperature to a temperature utilization component (e.g., 114 of FIG. 1 or 216 of FIG. 2) of the additive manufacturing system for purposes of monitoring the heating and cooling of the sintering. In some embodiments, the temperature utilization component may utilize the applied temperature for controlling aspects of operation of the additive manufacturing system.

After a current top layer has been so formed by steps 708 through 714, processing continues looping back to step 708 to repeat the processing for a next top layer of the metal object. Eventually, the manufacturing process completes when a final top layer has been fabricated.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that the terms "includes," "including," "has," "contains," and variants thereof are used herein, such terms are intended to be inclusive in a manner similar to the term "comprises" as an open transition word without precluding any additional or other elements.

The descriptions of the various embodiments of the present disclosure have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The invention claimed is:

1. A method for thermal monitoring for a metal additive manufacturing system, the method comprising:
   determining an emissivity value based, at least in part, on an arithmetic product of a predetermined roughness value and a predetermined slope-related value, wherein the predetermined roughness value and the predetermined slope-related value are predetermined based, at least in part, on measurements of a previously manufactured object;
   sintering, by the metal additive manufacturing system, of a metal to form a top surface of an object to be manufactured;
   detecting, using an infrared sensor, infrared radiation from at least a portion of the top surface of the object to be manufactured;
   generating a temperature based, at least in part, on the detected infrared radiation and the emissivity value; and
   applying the temperature to a temperature utilization component of the metal additive manufacturing system.

2. The method of claim 1 wherein the predetermined roughness value is an average roughness and the predetermined slope-related value is either an average tilt angle value or a root-mean-square slope value.

3. The method of claim 1 wherein the step of detecting infrared radiation comprises detecting infrared radiation by an infrared imaging device.

4. The method of claim 1 wherein the step of detecting infrared radiation comprises detecting infrared radiation from the portion of the top surface of the object to be manufactured using an infrared sensor sensitive to radiation in a range of about 1micron to about 13 microns.

5. The method of claim 1 wherein a ratio of the predetermined roughness value over a maximum wavelength of sensitivity of the infrared sensor is greater than about 0.7.

6. The method of claim 1 wherein the predetermined roughness value and the predetermined slope-related value are determined over a two-dimensional portion of a surface of the previously manufactured object.

7. The method of claim 1 wherein the predetermined roughness value and the predetermined slope-related value are provided as user inputs to the additive manufacturing system.

8. The method of claim 1 wherein the predetermined roughness value and the predetermined slope-related value are configuration parameters of the metal additive manufacturing system.

9. A thermal monitoring apparatus for use with a metal additive manufacturing system, the thermal monitoring apparatus comprising:

an emissivity determination component configured to determine an emissivity value, the emissivity value determined based, at least in part, on an arithmetic product of a predetermined roughness value and a predetermined slope-related value, wherein the predetermined roughness value and the predetermined slope-related value are predetermined based, at least in part, on measurements of a surface of a previously manufactured object manufactured by the metal additive manufacturing system; and an infrared sensor, coupled to receive the emissivity value, configured to detect infrared radiation from at least a portion of a top surface of a metal object to be manufactured, wherein the thermal monitoring apparatus determines a temperature of the top surface of the object to be manufactured based, at least in part, on the detected infrared radiation and the emissivity value, and applies the temperature to a temperature utilization component of an additive manufacturing system.

\* \* \* \* \*